United States Patent [19]

Gartz

[11] Patent Number: 5,558,220
[45] Date of Patent: Sep. 24, 1996

[54] CASE AND TRAY FOR HOLDING HIGH DENSITY DISCS

[75] Inventor: Kaj Gartz, Orange, Conn.

[73] Assignee: Owen J. Meegan, Salem, Mass.; a part interest

[21] Appl. No.: 492,737

[22] Filed: Jun. 21, 1995

[51] Int. Cl.⁶ .................................................. B65D 85/57
[52] U.S. Cl. ........................................ 206/308.1; 206/310
[58] Field of Search ................................. 206/308.1, 309, 206/310, 312, 493

[56] References Cited

U.S. PATENT DOCUMENTS

| | | |
|---|---|---|
| 3,524,540 | 3/1968 | Brown et al. . |
| 3,724,652 | 4/1973 | Francini et al. . |
| 4,339,037 | 7/1982 | Doering . |
| 4,535,888 | 8/1985 | Nusselder . |
| 4,577,756 | 3/1986 | Hennessy et al. . |
| 4,702,369 | 10/1987 | Philosophe . |
| 4,793,480 | 12/1988 | Gelardi et al. . |
| 4,805,770 | 2/1989 | Grobecker et al. . |
| 4,903,829 | 2/1990 | Clemens . |
| 4,993,552 | 2/1991 | Bugbey et al. . |
| 5,244,085 | 9/1993 | Lammerant et al. . |
| 5,269,409 | 12/1993 | Brandt .................................... 206/310 |
| 5,284,243 | 2/1994 | Gelardi ................................. 206/308.1 |
| 5,284,248 | 2/1994 | Dunker . |

FOREIGN PATENT DOCUMENTS

| | | |
|---|---|---|
| 0114631A1 | 1/1984 | European Pat. Off. . |
| 3425579A1 | 1/1986 | Germany . |
| 822305 | 10/1959 | United Kingdom . |

*Primary Examiner*—Paul T. Sewell
*Assistant Examiner*—Luan K. Bui
*Attorney, Agent, or Firm*—Owen J. Meegan

[57] ABSTRACT

A case and tray for holding at least one high recording density disc. The case comprises a base (14), a cover (11) and a tray (12) for carrying at least one disc is disposed within the case. The tray (12) has a generally rectangular shape and is adapted to fit in the base (10). A cylindrical hub (50, 60) having a locking side and a spring side is unitarily formed and centrally located on the tray. Lips (51, 61) extend from the locking side of the hub (50, 60) and the underside of the lips (57, 67) are spaced from the tray (12) at a distance not less than the thickness of the disc. The portion of hub between the tray (12) and the lips (57, 67) is rigid. Springs (53, 63) are disposed on the spring sides of the hub (50, 60). The springs (53, 63) are adapted to move inwardly when engaged by the center hole of the disc as it is forced over the lips (57, 67) and onto the hub (50, 60) to hold the disc on the hub between the lip (57, 67) and the tray (12). Cavities (56, 66) are disposed in the tray on the spring side of the hub (50, 60) to dislodge discs from the hub whereby a user can urge the outer edge (72) of a disc to move the internal edge over the spring (53, 63) to remove a disc from the tray.

26 Claims, 4 Drawing Sheets

1

CASE AND TRAY FOR HOLDING HIGH DENSITY DISCS

FIELD OF THE INVENTION

The present invention relates to a case for holding at least one high recording density disc, commonly known as a compact disc or a CD. The invention particularly relates to a case with a structurally stable tray to hold at least one disc and constructed to hold two discs and specifically to a case with a transparent tray for holding two CDs.

BACKGROUND OF THE INVENTION

Cases for holding compact discs are well known to the art. Such cases are commonly made of molded styrene and are a relatively inexpensive packaging which is required to house and display the discs for sale. Even though the case is relatively inexpensive, when compared to the cost of the CDs it holds, it must be strong enough to hold the discs over a long period of time and withstand frequent opening, closing and dropping. Industry requirements have dictated the dimensions of the case. Sizes greater than these standards, and especially greater thickness, have led to a lack of acceptance by the consumer because an oversize case is more difficult to store, especially by those who own large numbers of CDs.

The recording industry currently markets works which are so long they require more than one disc. Digitized information for research purposes frequently requires more than one disc also. Increasing the thickness of the case to accommodate a second disc is not always acceptable to the consumer. The industry has sought a case for two CDs which has the same thickness as a case for the single CD.

Popular cases currently available for storing CDs include a rectangular base, a corresponding rectangular cover pivotally connected to the base and a rectangular tray for holding the CD fixedly connected to the base. The rectangular tray includes a circular recess for receiving the disc and a central circularly-shaped, radially-ribbed clamp which receives the center hole of the CD by means of an interference fit to hold the CD in the case.

The U.S. Pat. No. to Lammerant et al., 5,244,085 and the U.S. Pat. No. to Dunker, 5,284,248, disclose a modification of existing CD cases which enable the storage of two CDs in a case which previously had been adapted to hold only one CD. To provide for holding two CDs, a tray which heretofore had been fixedly held within the base of the case is pivotally mounted in the base so that access to the tray can be gained from either side of it. The CDs are held by a tenon system. The tenon system includes pawl teeth which stand around a central hole disposed in the tray. Half of the pawl teeth stand substantially perpendicular to the face facing the cover and the other half stand on the face facing the base. One of the sets of teeth holds one CD with a pawl action and the other set holds another CD on the opposite side of the tray with the pawl action. The individual teeth are held on a ring disposed within the central hole in the tray. The ring is suspended from the central hole by a radial arrangement of spokes. I have found the spokes are relatively weak and cannot always support the weight of the CDs they are called on to hold. Dropping a case will frequently break the spokes and render the tray inoperative.

To provide additional strength to the tray and the spokes (and to allow the teeth to move laterally without breaking) the composition of the tray is modified by doping it with a rubber to make it more resilient. Pure styrene is quite brittle and can be used for the base and the cover. Doping the styrene of the tray causes it to become opaque and adopt the color of the dopant. Literature is conventionally disposed within the case against the cover, the base and the spline. This literature provides sales and identification material. Information stored beneath the tray cannot be seen through the tray. Since CDs are now manufactured with promotional material on both sides, it is beneficial to use a transparent tray. But since the styrene is extremely rigid and the teeth which hold the CDs break easily it has not been possible, heretofore, to provide an acceptable, unitarily molded tray without opacity producing additives.

SUMMARY OF THE INVENTION

The present invention relates to a case for holding at least one compact disc. As is usual with such discs, they have an outer edge and a central hole which is defined by an internal edge. The case includes the base which has a rectangular flat bottom and side walls rising from the edges of the flat bottom. A tray is fitted in the base and also has a generally rectangular shape. The tray is hinged to the base and the hinge can be located either at one end or the other so it can be folded from the case either in a portfolio-style or a book-style configuration. In either configuration both surfaces of the tray are available to receive a compact disc.

A hub is centrally located on the tray. The hub extends from the tray and has a generally cylindrical shape and a diameter not greater than the diameter of the central hole of the compact disc. One side of the hub is a locking side and the other side is a spring side. In the preferred embodiment the hub extends from both surfaces of the tray.

A lip extends from a locking side of the hub adjacent the top thereof. The underside of the lip is spaced from the tray at a distance not less than the thickness of the disc. An underside of the lip is tapered so that it will engage the internal edge of the compact disc and hold it in place. An integrally molded spring is disposed on a spring side of the hub. The locking side of the hub is diametrically opposite the spring side. The spring moves inwardly when engaged by the internal edge of the disc as it is forced over the lip. Thus, the disc is firmly held on the hub between the spring and the underside of the lip. The lip preferably has a construction such that it is widest at a position diametrically opposite the spring. The width of the lip tapers to nothing on lateral extensions from the widest point. Preferably, there is no lip at locations normal to a line drawn through the axis of the hub between the spring and the widest point of the lip. Additionally, the top of the spring and portions of the hub disposed on either side of the spring are chamfered to enable one to easily dispose a CD on the hub over the lip.

With the construction of the present invention at least one cavity is disposed in the tray on the same surface of the tray as where the spring is located on the hub. The cavity is formed where the outer edge of the CD will be disposed. In this way a thumb can be placed on the hub and an index finger in the cavity (and beneath the CD) to remove the CD from the tray. The CD cannot be removed from the opposite side of the hub because the lip prevents its removal.

In the preferred embodiment, the recess is formed on the same portion of the cylindrical surface of the hub where the spring is located. The spring is disposed within the recess and is free to move inwardly within the recess. Since the tray is particularly designed to receive two CDs, the hub extends to both surfaces of the tray. The spring is arranged so on the face surface of the tray it is on one circumferential surface of the hub and on the obverse surface of the tray it is on the opposite circumferential surface. Similarly, the lips are also oppositely disposed on opposite circumferential sides of the hub.

In a preferred embodiment the springs are flexible posts. The posts are disposed within recesses within the hub. Each post extends through the tray from respective upper and lower ends of the hub. A portion of the post is disposed outside the circumference of the hub to engage an internal edge of the disc.

A cover is provided for the case. The cover is hinged to the base to provide for opening to allow access to disc on the tray. The height of both hubs is such that they will allow the cover and the base to be closed over them.

DESCRIPTION OF THE PREFERRED EMBODIMENTS

Figure 1:
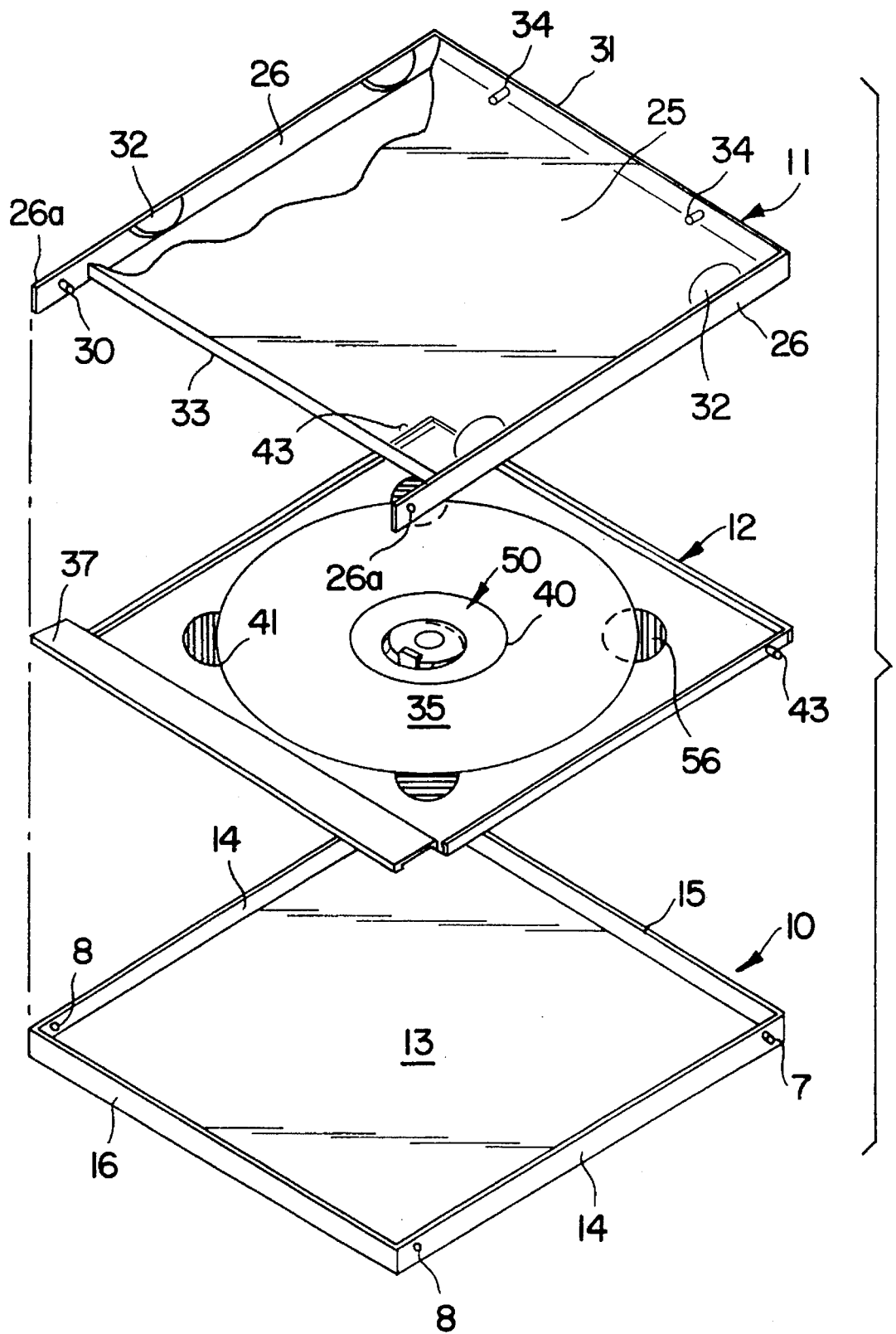
FIG. 1 is an exploded perspective view of three principle parts of the case including the improved tray carrying two CDs according to the present invention.

Referring to FIG. 1, a base 10 comprises a flat rectangular bottom 13, two lateral side walls 14, a front wall 15 and a back wall 16. If desired, the lateral walls 14 can have recesses (not shown) formed in the central areas of the side walls to strengthen case. Each of the side walls 14 adjacent the back wall 16 is provided with holes 8 which will receive corresponding spindles on the cover as will be described hereinafter. The side walls 14 adjacent the front wall 15 are provided with protuberances 7 to fit into notch on cover 11 for retaining the cover 11 when it is folded onto the base 10.

An illustrated title sheet (not shown) can be placed on the bottom 13 of the base 10. This sheet is folded back at the front and at the rear to allow the title to be seen in small print through the back wall 16 and the front wall 15 of the case.

The cover 11 comprises a flat rectangular wall 25, almost square because its length is shorter than that of the base 10. Its front and back sides have the same length as the front and back sides of the bottom 13 of the base 10 and its lateral sides are shorter than the lateral sides of the bottom 13. The cover 11 comprises two lateral side walls 26, a back wall 33 and a front wall 34. The lateral side walls 26 extend beyond the rear wall 33 of the cover to form two arms 26a. These arms 26a are provided with spindles 30 intended to be inserted into holes 8 in the base 10. Thus the lateral walls 26 of the cover 11 enclose the walls 14 of the base 10. They rest on a small edge (not shown) of the bottom 13 of the base 10. The cover has a slightly raised front edge which forms a part of the front wall. The front edge rests on the upper edge of the front wall 15 of the base 10. The cover includes tabs 32 which extend toward the interior panel of the bottom 13 and which leave a clearance in which it is possible to slip a booklet with an illustrated cover page. The booklet is stopped at the rear by the rear wall 33. At the front, the booklet is stopped by frustroconical protuberances 34.

The disc holding tray 12 comprises a rectangular plate 35 including a back edge, a front edge and two lateral edges. The rear of the plate 35 includes a strip 37 which, in the closed position of the case, rests on the upper edge of the back wall 16 of the base 10. A hub 50 is centrally molded on the tray 12 to retain discs, as will be discussed hereinafter. A ring 41 is formed on the tray in a location which will engage the outer edge of the disc to prevent the body of the disc (that is the surface of the disc between its outer edge and its inner edge) from rubbing against the tray 35. A ring 40 is formed adjacent the hub 50 and serves the same purpose as ring 41. At least one cavity 56 is disposed on the tray to enable a user to dislodge a disc disposed upon the hub. The cavity 56 is radially offset from the hub by a predetermined distance at least equal to the radius of the CD.

The tray 12 has spindles 43 extending from the lateral side edges adjacent the front edge. These spindles 43 are disposed in openings (not shown) in the lateral side walls 14 of the base 10. In the illustrated embodiment, the openings (not shown) are adjacent the front wall 15 of the base 10. In this way the tray 12 can be swung portfolio-style to enable a user to have access to either surface of the tray. In other embodiments, the spindles 43 can be placed adjacent the strip 37 and fitted into an opening in the side walls 14 adjacent the back wall 16. In this latter case, access to both surfaces of the tray 12 is provided in a book-like fashion.

Figure 2:
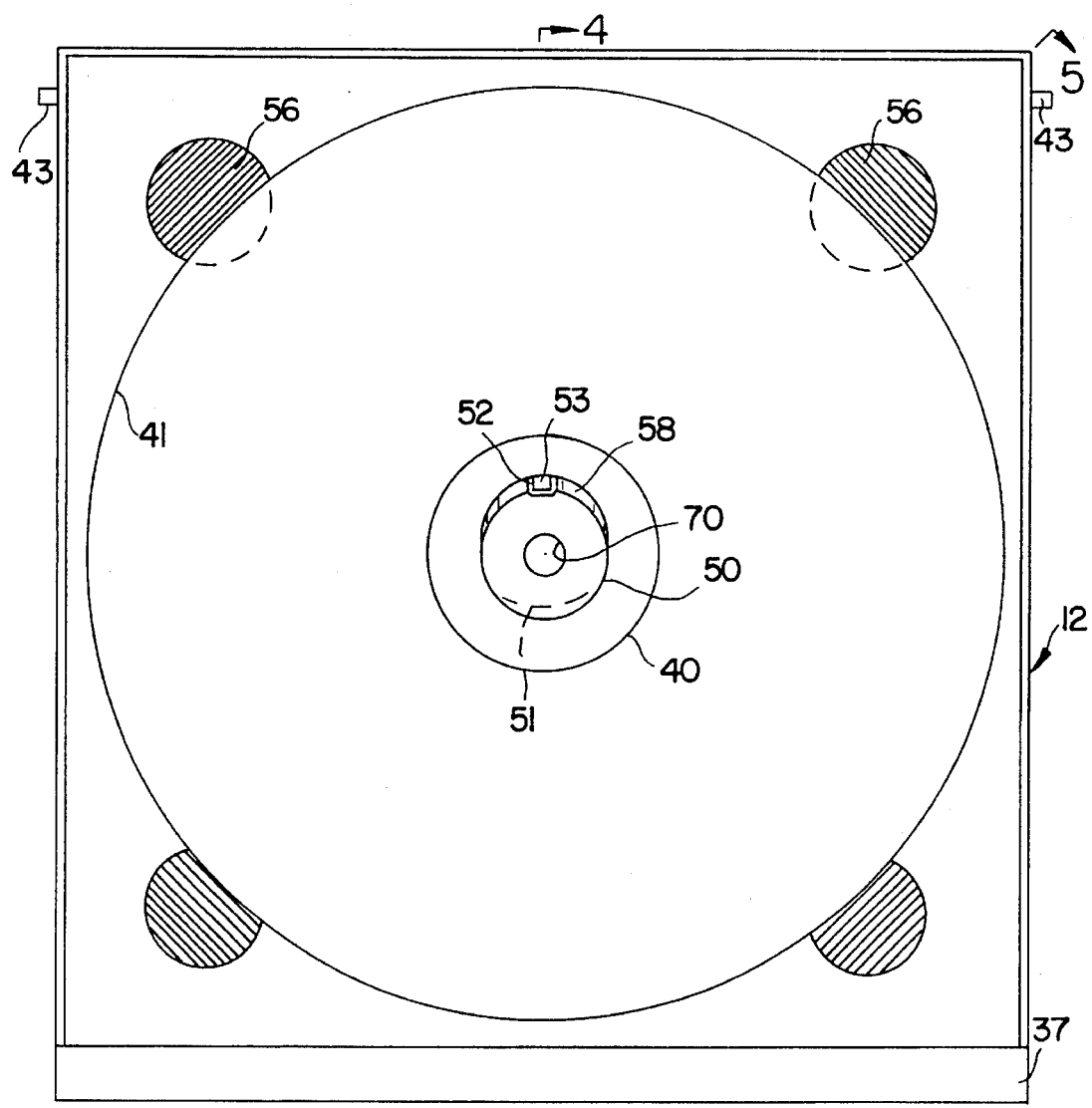
FIG. 2 is a plan view of the face surface of the disc holding tray capable of carrying two CDs.

Referring now to FIG. 2, the face surface of the tray 12 is shown. As described with reference to FIG. 1, the tray is generally square with a strip 37 exposed at one end thereof. The strip is raised from the plain of the tray to provide a support for a tray to hold it in place within the base 10. A hub 50 is centrally disposed on the tray 12. The hub 50, 15 mm. or less in diameter (no more than 0.1 mm. less) extends from the surface of the tray 12 sufficiently to hold a disc but no so far as to obstruct closing of the case. A lip 51 extends from a locking side of the hub 50 (represented by dotted lines in the drawing). The lip is about 1 mm. at its widest point. A recess 52 is disposed on the spring side of the hub, diametrically opposite the widest point of the lip 51. A spring 53, in this embodiment an upstanding post, is disposed within the recess 52 and extends slightly outside (0.5 mm.) of the circumference of the cylindrical hub 50 to provide a spring action. The spring 53 is free to move within the recess 52. The upper edge of the hub 50 and the post 53 has a chamfer 58 with the greatest amount of chamfer being on the top of the post 53 and either side thereof. The chamfer 58 gradually diminishes to nothing at a point normal to a line drawn through the axis of the hub 50 and between the post 53 and the widest portion of the lip 51. Similarly, with regard to lip 51, the width of the lip is widest diametrically opposite the post 53 and lateral extensions of the lip diminish to nothing as it approaches a line drawn normal to the axis as described above.

Thus, when a CD is urged on the top of the hub 50, it will shift slightly over the chamfer 58 and simultaneously slip over and thence under the lip 51. The post 53 will move inwardly in recess 52 and then outwardly as CD slips under the lip 51. In some embodiments it may be desired to have two or more posts 53 disposed in an equal number of recesses radially offset from the position diametrically opposite the post 53 as shown in the drawing. Such a modification can provide additional holding power for the CDs.

A ring 41 is disposed on the face surface of the tray 12. The ring 41 engages a disc slightly inside of the outer edge of a CD to prevent the recording surface of the CD from engaging the surface of the tray 12. At least one cavity 56 is disposed on the tray 12 in a position radially offset from the hub 50. In the embodiment as shown, two cavities 56 are illustrated. These cavities 56 in the tray 12 enable the user to place a finger beneath the CD to disengage it from the hub 50. Importantly, these cavities are disposed on the same side of the tray as the post 53 is located thereby to enable the user to slip the CD off the hub 50 and from under the lip 51.

Figure 3:
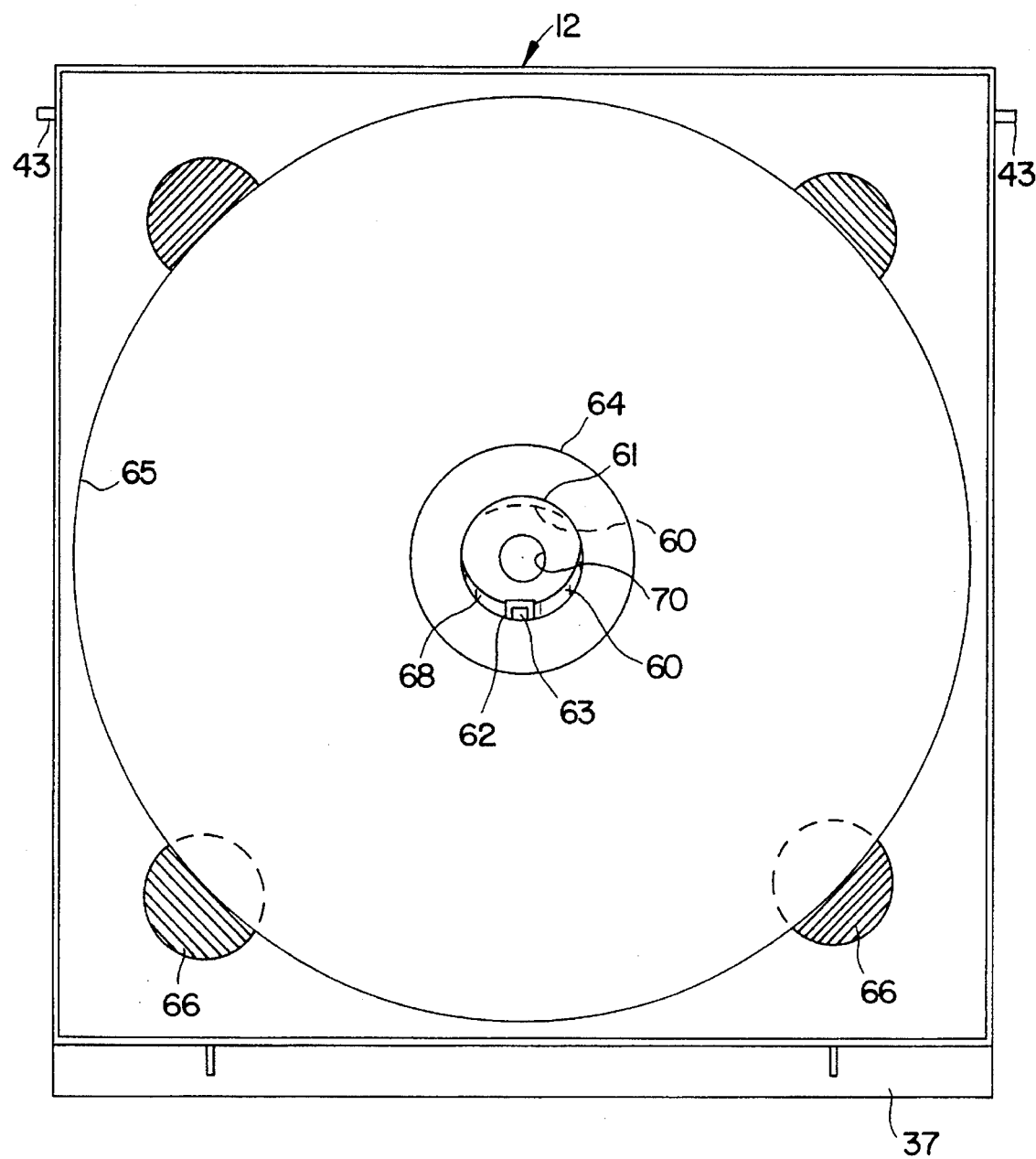
FIG. 3 is a plan view of the obverse surface of the tray illustrated in FIG. 2.

Turning to FIG. 3, the obverse surface of the tray 12 is shown. In this Figure a recess 62 is formed in the hub 60. The hub 60 is an integral molding in the tray 12 and the distinction between the hub 50 on the face surface and hub 60 on the obverse surface is merely for graphic representation of the invention. Lip 61 is on the opposite cylindrical surface forming hub 60 as lip 51 is on hub 50. Recess 62 is diametrically opposite the widest point of lip 61. A post 63 is disposed within recess 62 and is free to swing back and forth so as to engage a central opening in a disc when placed upon hub 60. The top of hub 60 has a chamfer 68 to enable easy placement of a CD upon hub 60, as described previously with reference to FIG. 2. Cavities 66 are disposed on the tray 12 at the same location relative to post 63 and lip 61 as was described with reference to FIG. 2. Rings 64 and 65 serve the same purpose and are constructed in a like manner as rings 40 and 41 described with reference to FIG. 2.

Figure 4:
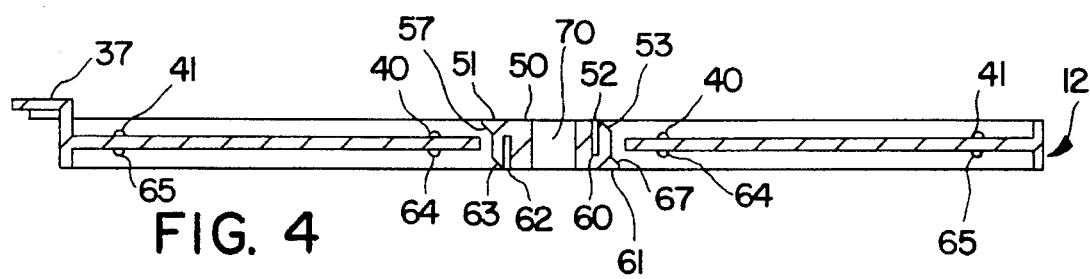
FIGS. 4 and 5 are cross-sectional views taken along the lines 4—4 and 5—5 of FIG. 2, respectively.
Figure 4A:
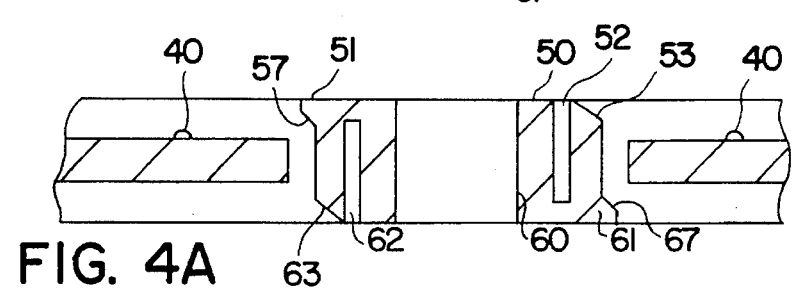
FIG. 4A is a fragmentary enlarged view of the hub shown in FIG. 4

Referring now to FIGS. 4 and 4A, the tray 12 is shown in cross-section. The hub is disposed in the center of the tray. Hub 50 is shown on the face surface of the tray 12. Hub 50 includes a lip 51 with a tapered underside 57. Hub 50 also includes post 53 disposed within recess 52 which is slightly bent out of the circumference of the hub so as to provide spring action. As shown, recess 52 begins on the obverse surface of tray 12 and opens on the face surface. Correspondingly, a recess 62 begins on the face surface and opens on the obverse surface. A post 63 begins on the face surface and extends to the obverse surface. Post 53 begins on the obverse surface and extends to the face surface. Each of the posts 53 and 63 are relatively long since they begin on opposite surfaces of the tray and thus can bend fairly easily without breaking and provide the spring action. The length is particularly valuable when the tray is molded of clear styrene which is rather brittle. As shown, the free ends of posts 53 and 63 are chamfered to receive discs easily. The taper of the chamfer preferably corresponds to the taper on the undersides 57 and 67 of lips 51 and 61 respectively. In the view shown in FIG. 4 the lips 51 and 61 are widest at a point diametrically opposite posts 53 and 63. A central opening 70 is disposed within the hub to provide for alignment of the hub when a CD is being placed on it using automatic equipment. Strip 37 is disposed on the side of the tray 12.

Figure 5:
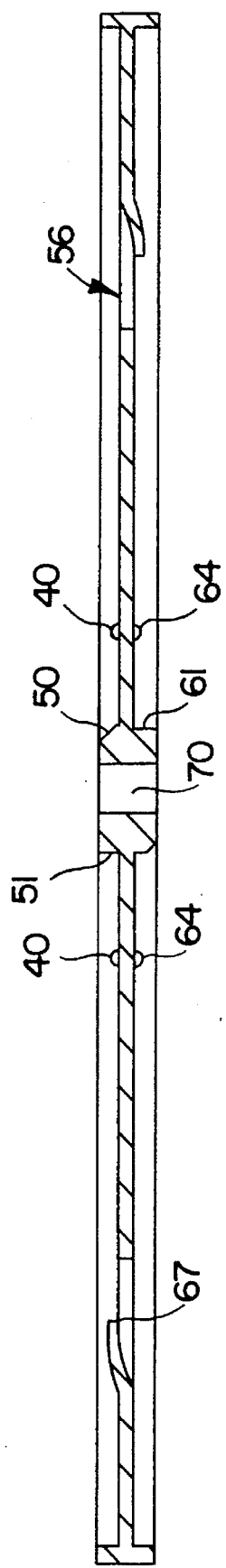
Figure 5A:
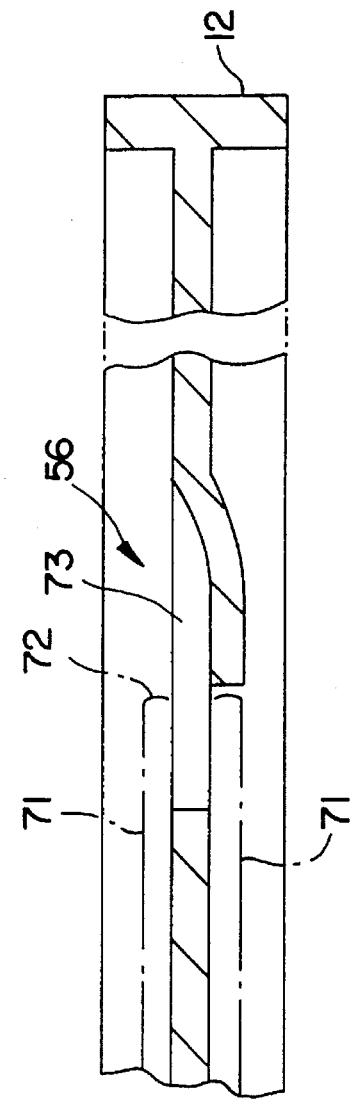
FIG. 5A is a fragmentary enlarged view of one of the cavities on the tray shown in FIG. 5.

Referring to FIG. 5, it can be seen that the hub 50, 60 is solid where this cross-section is taken. The lips have narrowed to nothing. The chamfer on the hub 53, 63 is lesser and each will be nonexistent at a point normal to a line between the posts 53, 63 (shown in FIG. 2). In this way, a CD can be easily slipped off the hub when using the appropriate cavities in the tray. As shown in FIG. 5A, cavity 56 is formed in the tray 12. The cavity enables one to place a finger in it and under a CD to dislodge the CD from the hub. An enlargement of the cavity 56 on the face surface of the tray is shown in FIG. 5A. An outer edge 72 of a CD 71 is disposed on the tray so one can insert a finger in the cavity 56 adjacent the section 73 and dislodge the CD from the hub.

It is apparent that changes and modifications can be made within the spirit and scope of the present invention, but it is my intention, however, only to be limited by the appended claims.

As my invention I claim:

1. A case for holding at least one high recording density disc, said disc having an outer edge and a central hole defined by an internal edge, said case comprising:

a base having a flat bottom and sidewalls disposed around the perimeter thereof;

a tray for carrying at least one disc, said tray being adapted to fit in said base;

a hub integrally formed and centrally located on said tray, said hub extending from said tray and having a generally cylindrical shape and a diameter not greater than the diameter of said central hole;

locking means on a locking side of said hub to detachably retain on said hub a portion of said central edge of said disc, said locking means being inflexibly disposed on said locking side of said hub;

spring means to urge said portion of said central edge against said locking means and said hub whereby said disc is detachably secured on said tray by said locking means.

2. A case for holding at least one high recording density disc, said disc having an outer edge and a central hole defined by an internal edge, said case comprising:

a base;

a tray for carrying at least one disc, said tray being adapted to fit in said base;

a hub having a locking side and a spring side integrally formed and centrally located on said tray, said hub extending from said tray and having a generally cylindrical shape and a diameter not greater than the diameter of said central hole;

a lip extending from said locking side of said hub, said lip being inflexible and having an inflexible underside, said underside being spaced from said tray at a distance no less than the thickness of said disc;

spring means disposed on the spring side of said hub, said spring means being adapted to move inwardly when engaged by said internal edge as a disc is forced over said lip and onto said hub whereby to hold said internal edge on said hub in the space between said lip and said tray whereby to detachably hold said disc on said tray;

a cover for said case, said cover being adapted to enclose said sides;

hinge means connecting said cover and said base to provide for opening said cover relative to said base and allow access to a disc on said tray.

3. The case according to claim 2 further including means disposed in said tray to dislodge said disc from said hub, said means being radially offset from said spring means by a predetermined distance and located on the same side as said spring means whereby a user can urge said outer edge to move said internal edge over said spring means to dislodge said disc from said hub.

4. The case according to claim 2 wherein peripheral edge of the spring means and the edges of the hub adjacent the peripheral edge are chamfered and wherein the underside of said lip is tapered.

5. The case according to claim 4 wherein said lip is widest opposite said spring means, the width of said lip tapering to nothing on lateral extensions from the widest point whereby to allow said internal edge to slide over said hub.

6. A case for holding at least one high recording density disc, said disc having an outer edge and a central hole defined by an internal edge, said case comprising:

a base having a rectangular flat bottom with a pair of long sides and a pair of short sides, said base including two lateral sidewalls adjacent said long sides, a front wall adjacent one of said short sides and a back wall adjacent the other short side;

a tray for carrying a disc, said tray having a generally rectangular shape and being adapted to fit in said base;

a centrally located hub, said hub extending from said tray and having a generally cylindrical shape and a diameter not greater than the diameter of said central hole, said hub having a locking side and a spring side comprising its cylindrical surface, said locking side being inflexibly disposed on said hub;

a lip extending from the locking side of said hub, said lip having an underside, said lip and the underside of said lip being inflexible and spaced from said tray at a distance no less than the thickness of said disc;

a recess disposed on the spring side of said hub;

spring means disposed within said recess, said spring means being adapted to move inwardly when engaged by said internal edge when a disc is forced onto said hub whereby to hold said internal edge on said hub in the space between said lip and said tray whereby to detachably hold said disc on said tray;

means to dislodge said disc from said hub, said means being disposed in said tray and radially offset from said spring means by a predetermined distance whereby a user can urge said outer edge to dislodge said disc over said spring means and from said hub;

a cover for said case, said cover being adapted to enclose said sides;

hinge means connecting said cover and said base to provide for opening said cover relative to said base and allow access to the disc on said tray.

7. The case according to claim 6 wherein the end of the spring means and the edge of the hub adjacent said spring means are chamfered whereby to allow said internal edge to slide over said lip.

8. The case according to claim 6 wherein the width of said lip is greatest at a location on said hub opposite said recess, the width of said lip tapering to nothing on lateral extensions from the point of greatest width.

9. The case according to claim 8 wherein the under-side of said lip is tapered whereby to engage said internal edge.

10. The case according to claim 6 wherein said tray has a face surface and an obverse surface and wherein said hub is disposed on both said face surface and said obverse surface, whereby to carry two discs on opposite surfaces of said tray, one recess in the hub beginning on the face surface and terminating within said hub on the obverse surface and a second recess in the hub beginning on the obverse surface and terminating within the hub on the face surface, said recesses being disposed on sides of said hub opposite to each other, said case further being characterized in that said spring means are posts disposed in each of the recesses.

11. The case according to claim 10 wherein the ends of the spring means and the edges of the hub adjacent them are chamfered and wherein the width of said lips are greatest at locations on said hub opposite said recesses, the width of said lips tapering to nothing on lateral extensions from said greatest widths whereby to allow an internal edge to slide over said hub, the undersides of said lips being tapered to hold said discs in place on said hub beneath said lip.

12. A case for holding two high recording density discs, said discs each having an outer edge and a central hole defined by an internal edge, said case comprising:

a base having a rectangular flat bottom with a pair of long sides and a pair of short sides, said base including two lateral sidewalls adjacent said long sides, a front wall adjacent one of said short sides and a back wall adjacent the other short side;

a tray for carrying two discs, said tray having a generally rectangular shape and having a face surface and an obverse surface, said tray being adapted to fit in said base;

a centrally located hub on said tray, said hub having inflexible surfaces comprising the sides of said hub, said hub extending from both said face surface and said obverse surface and having a generally cylindrical shape with a diameter no greater than the diameter of said central hole, said hub having two sides forming its cylindrical surface;

a first lip extending from the top of one side of the portion of the hub disposed on the face surface of said tray, said lip having an underside, the underside of said lip being inflexible and spaced from said tray at a distance not less than the thickness of said disc;

a second lip extending from the top of the second side of the portion of the hub disposed on the obverse surface of said tray, said lip having an underside, the underside of said second lip being inflexible and spaced from said tray at a distance not less than the thickness of said disc;

a spring means disposed on each of the sides of said hub opposite said lips and being adapted to move inwardly within said surfaces when engaged by said internal edge when a disc is forced onto said hub whereby to hold said internal edge on said hub in the space between said lip and said tray thus to detachably hold said disc on said tray;

a cover for said case, said cover being adapted to enclose said sides;

first hinge means connecting said cover and said base to provide for opening said cover relative to said base and allow access to the discs on said tray and second hinge means connecting said tray to said case to allow access to discs on both surfaces of the tray.

13. The case according to claim 12 further including a first means disposed in the face surface of said tray to dislodge one of said discs from said hub and a second means disposed in the obverse surface of said tray to dislodge another of said discs from said hub, each of said means being radially offset from the respective spring means by a predetermined distance whereby a user can urge a disc to dislodge it from said hub.

14. The case according to claim 12 wherein the spring means are posts and the ends of said posts and the peripheral edges of the hub adjacent them are chamfered.

15. The case according to claim 12 wherein the width of each of said lips is greatest at a location on said hub opposite said spring means, the width of the lip tapering to nothing on lateral extensions from the point of greatest width.

16. The case according to claim 15 wherein the under-side of each of said lips is tapered whereby to engage said internal edge.

17. The case according to claim 12 wherein said spring means are flexible posts, each post extending through said tray from respective upper and lower ends of said hub, at least a portion of said posts being disposed outside said hub whereby to engage the internal edge of said disc.

18. The case according to claim 12 wherein said tray is transparent.

19. A tray for holding at least one high recording density disc, said disc having an outer edge and a central hole defined by an internal edge, said tray comprising:

a plate;

a centrally located hub on said plate, said hub extending from said plate and having a generally cylindrical shape and a diameter no greater than the diameter of said central hole, said hub being integral with said tray and having a locking side and a spring side;

an inflexible lip extending from said locking side of said hub, said lip having an inflexible underside, the underside of said lip being spaced from said tray at a distance no less than the thickness of said disc;

spring means disposed on said spring side of said hub, said spring means being adapted to move inwardly into said hub when engaged by said internal edge when a disc is forced over said lip and onto said hub whereby to hold said internal edge on hub in the space between said lip and said tray and to detachably carry said disc on said tray.

20. The tray according to claim 19 wherein said tray has a face surface and an obverse surface and said hub extends from the face surface and the obverse surface of said tray whereby to carry two discs on opposite surfaces of said tray, said hub further having a first recess in one side of said hub terminating within said hub on the obverse surface and a second recess beginning on the obverse surface and terminating within the hub on the face surface, said recesses being disposed on sides of said hub opposite to each other and further wherein said spring means are flexible posts extending through said tray from respective upper and lower ends of said hub, at least a portion of said posts being partially disposed outside said hub whereby to engage the internal edge of said disc.

21. The tray according to claim 19 wherein the ends of said spring means and the edges of the hub adjacent them are chamfered and the width of said lip is greatest at a location on said hub opposite said recess, the width of said lip tapering to nothing in its extension from said greatest width.

22. A tray for holding at least one high recording density disc, said disc having an outer edge and a central hole defined by an internal edge, said tray comprising:

a plate;

a centrally located hub on said plate, said hub extending from said plate and having a generally cylindrical shape and a diameter not greater than the diameter of said central hole, said hub having one side which is rigid and a spring means disposed on the other side;

a lip extending from said rigid side of said hub, the underside of said lip being spaced from said plate at a distance not less than the thickness of said disc;

a spring means on the other side of said hub, said spring means being adapted to move inwardly when engaged by said internal edge when a disc is forced onto said hub whereby to hold said internal edge on said hub in the space between said lip and said tray whereby to detachably carry said disc on said tray.

23. The tray according to claim 22 further including means disposed in said tray on the spring means side of said hub to dislodge said disc from said hub, said means being radially offset from said spring means by a predetermined distance whereby a user can urge said outer edge to dislodge said disc from said hub.

24. A tray for holding two high recording density discs, said discs each having an outer edge and a central hole defined by an internal edge, said tray comprising:

a plate having a face surface and an obverse surface;

a centrally located hub on said plate, said hub extending from both the face and obverse surfaces of said plate and having a generally cylindrical shape and a diameter not greater than the diameter of said central hole, said hub having a portion on each side of said tray which is rigid and integrally connected to said plate to form a locking side on each surface of said tray, said locking sides each including a lip having an underside extending from each of the rigid portions of said hub, the underside of each lip being spaced from the respective surface of said plate at a distance not less than the thickness of said disc;

means to urge each of the central holes of the discs against the undersides of said lips whereby to hold the internal edges on said hub in the spaces between said lips and the surface of the tray associated with each of said lips whereby to detachably carry the discs on said tray.

25. The tray according to claim 24 wherein the lip on the portion of the hub adjacent the face surface of said tray and the lip on the obverse surface of said tray are juxtaposed.

26. The case according to claim 24 wherein said tray is transparent.

* * * * *